Nov. 24, 1925.   C. W. KOERTNER   1,562,892

DUSTPAN

Filed June 13, 1925

INVENTOR
C. W. Koertner
BY
ATTORNEY

Patented Nov. 24, 1925.

1,562,892

UNITED STATES PATENT OFFICE.

CONRAD W. KOERTNER, OF PEARL CITY, ILLINOIS.

DUSTPAN.

Application filed June 13, 1925. Serial No. 36,811.

*To all whom it may concern:*

Be it known that I, CONRAD W. KOERTNER, a citizen of the United States, residing at Pearl City, in the county of Stephenson and State of Illinois, have invented certain new and useful Improvements in Dustpans, of which the following is a specification.

This invention relates to household appliances and more particularly to receptacles such as dust pans and the like.

Among the objects of this invention is to provide a dust pan or other receptacle having a handle arranged in a novel manner and adapted to co-operate with the pan at a plurality of angles to be best suited to the convenience of the operator for different functions, as for both receiving and dumping.

Another object of the invention is to provide a dust pan having a handle so arranged as to eliminate the necessity for the operator to stoop to gather sweepings thereon, as occurs in course of operation of dust pans in general use at present, means being provided to facilitate the discharge of the material gathered.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings in which like reference characters designate the same parts in the several views, and in which—

Figure 1:
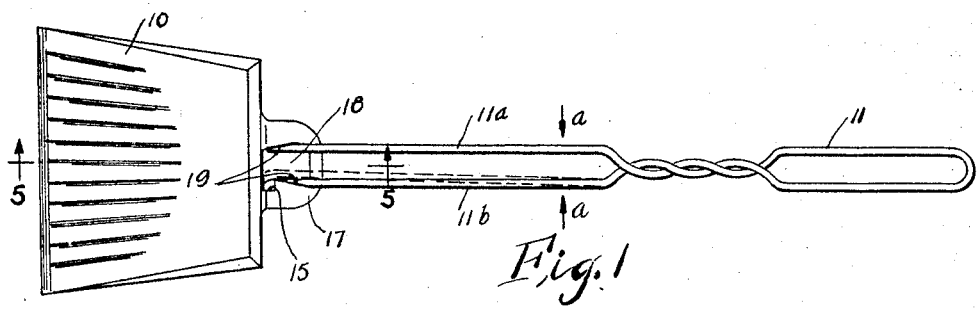
Figure 1 is a plan view of the invention with the handle extended.

Referring now more specifically to the drawings, I show my invention as comprising a suitable receptacle or carrying device such as the pan 10, and a handle 11 co-operative therewith. Said handle is arranged to engage the pan at a plurality of angles to suit the convenience of the operator. More specifically, this device is arranged to eliminate the necessity of stooping by the operator, for which purpose I make the handle 11 of considerable length and arrange the same to be operative for extending upward while the pan lies upon the floor in position for dust or other refuse to be swept thereon. However, when it is desired to discharge the dust or other material collected on said pan, the pan is readily caused or permitted to tilt with respect to the handle for this purpose without necessitating any other movement by the operator.

Said pan is mounted tiltably upon said handle by means of bearings 12. The handle is provided with journals in said bearings, such as shown at 13 and 14 which are formed at right angles to the handle and are preferably integral with the wire loop structure of which said handle consists. Means are provided adjacent to the bearings for engaging the handle to hold the pan temporarily against undesired tilting movement comprising resilient means co-operating therewith to provide for easy release or engagement of the means aforesaid. More specifically, the side portions 11ª and 11ᵇ of the handle are arranged to be movable relatively toward each other when the operator presses the same together as indicated by the arrows *a*, catch means such as a shoulder 15 being provided at a side of the handle to engage the member 11ᵇ of the handle and prevent further tilting movement until pressure is exerted as aforesaid to release the member 11ᵇ and thus permit said pan to be tilted by the action of gravity thereon into the position shown in Fig. 5. Preferably the stem or journal 14 is movable axially in its bearing to facilitate the aforesaid action of the member 11ᵇ of the handle. To limit the movement of the journal 14, stop means are provided such as a bend 14ª formed at a side of the bearing and as an extension of the journal, which is thus movable in the direction of arrow *a* until the portion 14ª comes into abutment with the bearing 12, the member 11ᵇ being then released from engagement with the shoulder 15 to permit a relative tilting movement between the pan and the handle. The journal 13 is likewise provided with means to limit its movement, if any, within its bearing, said means taking any suitable form such as a bend or lug 13ª, but by making the journal 13 shorter than 14, the release of the member 11ᵇ from the catch is facilitated.

Figures 2, 3:
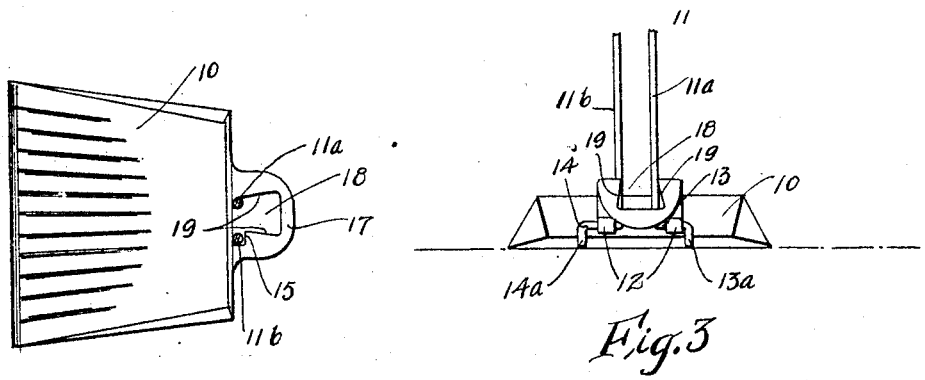
Fig. 2 is a similar view with the handle in erect operative position, a portion of the handle being broken away.
Figs. 3 and 4 are rear and side views of the invention positioned similarly to Fig. 2.
Figures 4, 5:
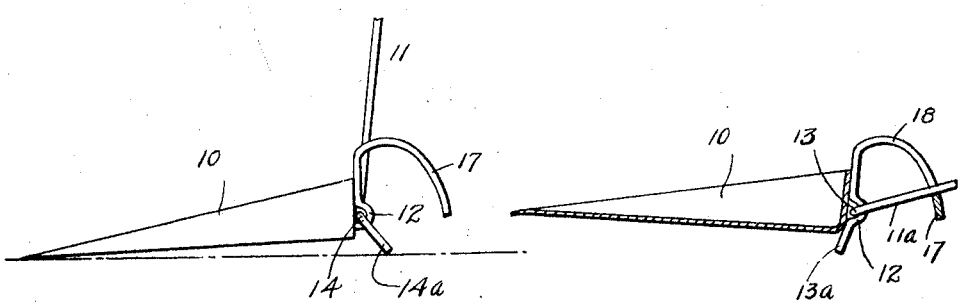
Fig. 5 is a section on the line 5—5 of Fig. 1.

The limits of tilting movement as between the pan and the handle are reached in one direction when the handle comes into position adjacent to the pan, and the member 11ᵇ is engaged by the shoulder 15 as in Figs. 2 to 4, and in the opposite direction when the handle comes into abutment with suitable keeper means borne by the pan such as a yoke 17 which extends rearward of the pan and is provided with a slot or guide 18 within which said handle is movable until it comes into abutment with the back of the yoke as shown in Fig. 5. Cam means 19 are provided along said slot which are operative with said resilient means and more particularly, with one or both the members 11ᵃ and 11ᵇ of the handle. By means of these cams, unintended movement or tilting of the pan is prevented as when the pan is tilted into the position shown in Figs. 1 and 5, since the cams are then in engagement with the resilient members 11ᵃ and 11ᵇ of the handle. But it will be noted that in order to tilt the pan into a position substantially at right angles to the handle, the operator need merely press down upon the pan by means of the handle, as against the floor or other object, and the cams will automatically spring the resilient members toward each other simultaneously with the tilting of the pan into position at an angle to the handle, so as to finally cause the engagement at the shoulder 15 as aforesaid. The catches 15 may be formed on either or both sides of the guide 18, but the unlocking of the handle is accomplished much easier with only the catch 15, as shown.

Preferably the bends or lugs 13ᵃ and 14ᵃ are extended below the bottom of the pan so that they will act as a support or feet for the pan at the rear thereof and operate to cause the same to assume automatically an inclined position to facilitate the sweeping of dust thereon. Said supports may likewise come into abutment with the pan at the lower edge portion thereof to be operative for limiting the downward movement of the pan.

In the normal manner of operation, the operator will take hold of the handle and press the pan down upon the floor, thus causing the same to tilt and the handle to become locked. The handle now extends upward to be conveniently held by the operator while the pan either lies on the floor or is carried in dirt-holding position. After dust or other refuse has been swept thereon, the operator presses the handle as shown by arrow *a* and so releases the locking mechanism and permits the pan to tilt by reason of its own weight and thus to discharge the refuse into a receptacle. The necessity of turning or otherwise manipulating the pan is thus eliminated and any possibility of the contents of the pan spilling either while being dumped or carried is prevented.

The yoke member is for the sake of simplicity constructed of a single strip of sheet material, while the handle including the supporting member is formed of a single length of wire.

I claim:

1. In a dust pan, the combination with a carrier, of a handle having tiltable engagement therewith, a yoke mounted on the carrier to act as a guide and limit the tilting movement of said handle, and a locking catch formed in the yoke to govern the tilting movement aforesaid, said yoke extending rearward of the carrier, said handle being movable longitudinally of the yoke in course of tilting, said locking catch being arranged adjacent to said carrier, said handle comprising a pair of spaced arms for supporting the carrier, one of which is resiliently movable transversely of the yoke into engagement with said locking means.

2. The combination as in claim 1 wherein one of said arms is a resilient member, and said yoke comprises a cam along said slot, said resilient member being movable transversely of the slot to engage the cam when the carrier is tilted in one position, or to ride along said cam against the resiliency of said resilient member and into engagement with said locking means while the carrier is being tilted into opposite position and to retain said carrier in such position.

3. The combination as in claim 1 wherein said yoke has a slot within which the handle is received in the yoke and comprises a cam along each side of said slot so arranged as to contact said arms when the handle is tilted relatively to the carrier, said handle being received between the cams, said locking means constituting a catch formed adjacent to the end of one of the cams, and in proximity to the carrier, the distance between the faces of the cams diminishing toward the carrier, whereby when the handle is tilted into position substantially at right angles to said carrier, said arms are moved toward each other as they ride along the cams until one of said arms is engaged with said catch, both cams being operative for causing an effective engagement at said catch, said handle being readily released by deflecting only that one of said arms which engages said catch.

In testimony whereof I affix my signature.

CONRAD W. KOERTNER.